(12) United States Patent
Nadler

(10) Patent No.: US 10,007,482 B2
(45) Date of Patent: Jun. 26, 2018

(54) METHOD AND SYSTEM FOR VOICE CHAT IN VIRTUAL ENVIRONMENT

(71) Applicant: Hashplay Inc., San Francisco, CA (US)

(72) Inventor: Ingo Nadler, Bad Breisig (DE)

(73) Assignee: Hashplay Inc., San Francisco, CA (US)

( * ) Notice: Subject to any disclaimer, the term of this patent is extended or adjusted under 35 U.S.C. 154(b) by 0 days. days.

(21) Appl. No.: 15/266,555

(22) Filed: Sep. 15, 2016

(65) Prior Publication Data

US 2017/0123752 A1 May 4, 2017

Related U.S. Application Data

(60) Provisional application No. 62/219,154, filed on Sep. 16, 2015.

(51) Int. Cl.
*G06F 3/16* (2006.01)
*G06T 13/20* (2011.01)
*G06N 3/00* (2006.01)

(52) U.S. Cl.
CPC ............ *G06F 3/165* (2013.01); *G06T 13/205* (2013.01); *G06N 3/006* (2013.01)

(58) Field of Classification Search
CPC ........ G06F 3/165; G06T 13/205; G06N 3/006
See application file for complete search history.

(56) References Cited

U.S. PATENT DOCUMENTS

| | | | | |
|---|---|---|---|---|
| 2003/0224856 | A1* | 12/2003 | Bukovsky | A63F 13/12 463/42 |
| 2007/0168359 | A1* | 7/2007 | Jacob | A63F 13/12 |
| 2007/0226307 | A1* | 9/2007 | Bae | G07F 17/32 709/206 |
| 2009/0240359 | A1* | 9/2009 | Hyndman | H04L 65/4015 700/94 |
| 2012/0079046 | A1* | 3/2012 | Murphy | G06N 3/006 709/206 |
| 2015/0325226 | A1* | 11/2015 | Rosedale | G10H 5/02 381/119 |

* cited by examiner

*Primary Examiner* — Maurice L. McDowell, Jr.
(74) *Attorney, Agent, or Firm* — Ziegler IP Law Group, LLC

(57) ABSTRACT

A method for voice chat in a virtual environment includes receiving a plurality of audio streams corresponding to a plurality of avatars in the virtual environment, determining relative distances between the avatars in the virtual environment, calculating change in volumes of the audio streams, depending on the determined relative distances between the avatars, normalizing volumes of the audio streams depending on the calculated change in volumes, mixing the normalized audio streams to create a plurality of mixed audio streams, wherein one mixed audio stream corresponds to one avatar, and relaying the mixed audio streams to corresponding avatars.

18 Claims, 3 Drawing Sheets

METHOD AND SYSTEM FOR VOICE CHAT IN VIRTUAL ENVIRONMENT

TECHNICAL FIELD

The present disclosure relates generally to virtual reality; and more specifically, to a method for voice chat in a virtual environment. Further, the present disclosure relates to a system for voice chat in a virtual environment.

BACKGROUND

Present day technologies such as virtual reality provide users with a feeling of immersion in a virtual environment. A user may use a virtual reality device to experience such virtual environment. Further, the user may interact in the virtual environment by controlling a virtual entity (or avatar) representing the user in the virtual environment.

Nowadays, a group of users may interact with each other using voice chat within a virtual environment. Therefore, the virtual environment includes avatars of each user of the group of users. For implementation of voice chat, each user receives a mixed stream of voices including voices of all other users in the virtual environment. However, present day provisions for voice chat in the virtual environment have certain limitations. The existing techniques for voice chat, mix (or combine) voices from each user (present in the virtual environment) at the same volume level to create mixed stream of voices for the other users. Therefore, the users are unable to comprehend spatial distance relation (volume with respect to distance) of avatars based on the created (or provided) mixed stream of voices to the users. Further, if the virtual environment includes multiple locations and each location includes at least one avatar, the comprehension of the spatial distance relation as well as the speech of the avatars with respect to the multiple locations becomes difficult.

Therefore, in light of the foregoing discussion, there exists a need to overcome the aforementioned drawbacks associated with techniques for voice chat in a virtual environment.

SUMMARY

The present disclosure seeks to provide a method for voice chat in a virtual environment.

The present disclosure also seeks to provide a system for voice chat in a virtual environment.

In one aspect, an embodiment of the present disclosure provides a method for voice chat in a virtual environment, the method comprising:
- receiving a plurality of audio streams corresponding to a plurality of avatars in the virtual environment;
- determining relative distances between the avatars in the virtual environment;
- calculating change in volumes of the audio streams, depending on the determined relative distances between the avatars;
- normalising volumes of the audio streams depending on the calculated change in volumes;
- mixing the normalised audio streams to create a plurality of mixed audio streams, wherein one mixed audio stream corresponds to one avatar; and
- relaying the mixed audio streams to corresponding avatars.

In another aspect, an embodiment of the present disclosure provides a system for voice chat in a virtual environment, the system comprising:
- a plurality of user devices associated with a plurality of users, wherein one user device is associated with one user being represented by an avatar in the virtual environment;
- a server communicably coupled to the plurality of user devices, wherein the server comprises a voice chat engine operable to:
  - receive a plurality of audio streams corresponding to a plurality of avatars in the virtual environment;
  - determine relative distances between the avatars in the virtual environment;
  - calculate change in volumes of the audio streams, depending on the determined relative distances between the avatars;
  - normalise volumes of the audio streams depending on calculated change in volumes;
  - mix the normalised audio streams to create a plurality of mixed audio streams, wherein one mixed audio stream corresponds to one avatar; and
  - relay the mixed audio streams to corresponding avatars.

Embodiments of the present disclosure substantially eliminate or at least partially address the aforementioned problems in the prior art, and enables experiencing voice chat, in a virtual environment, based on spatial distance of avatars in the virtual environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
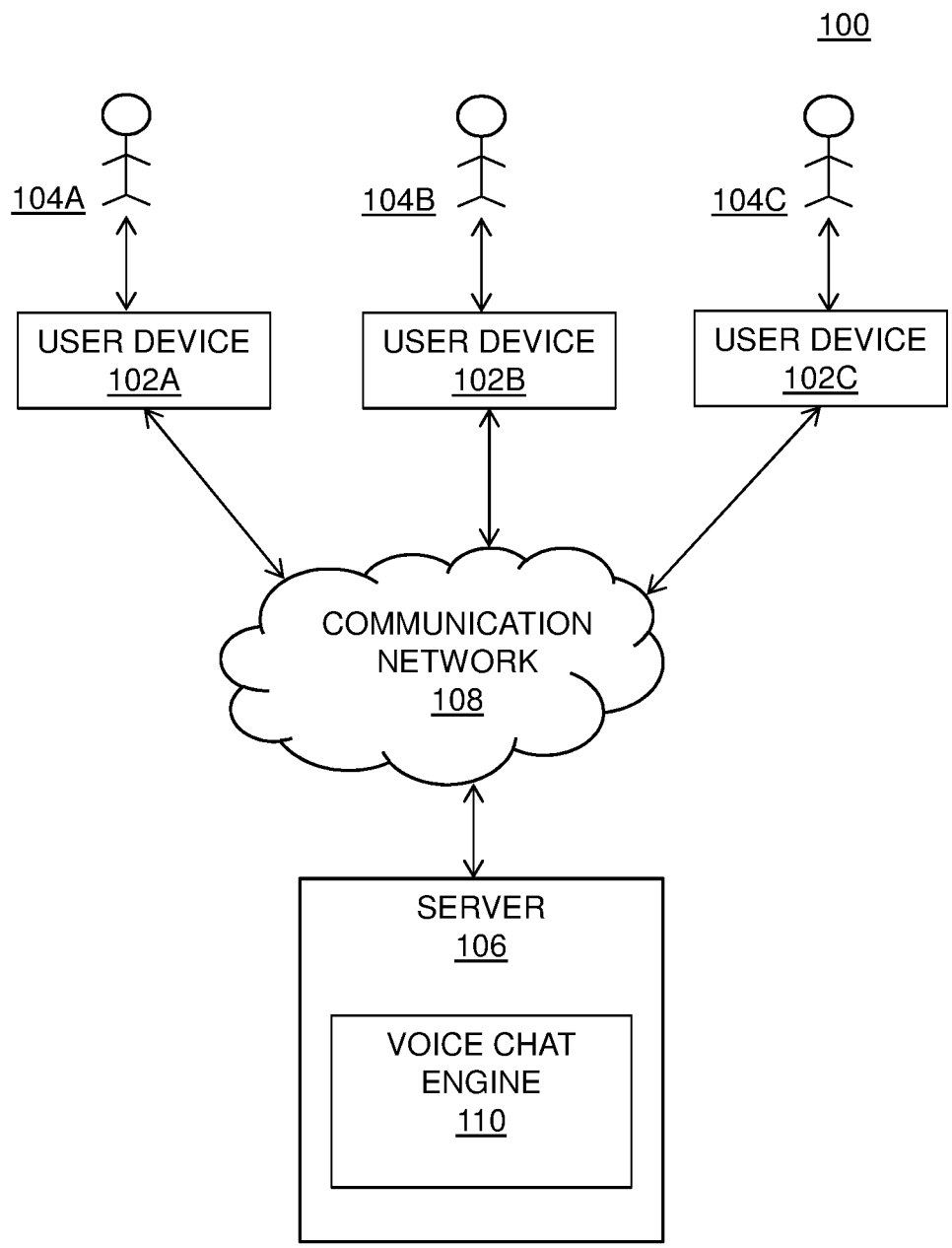
FIG. 1 is a schematic illustration of a system for voice chat in a virtual environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

The term "virtual environment" refers to a computer generated, three dimensional environment, designed for providing a user with an immersive experience of virtual reality. Specifically, the user may interact with other users and virtual objects within the virtual environment for a realistic virtual reality experience.

The term "avatar" refers to a virtual entity within a virtual environment. Specifically, the avatar may be an icon or figure used to represent a user within the virtual environment, and may be controlled by the user. Further, a plurality of avatars may interact with each other and/or with virtual objects in the virtual environment. It may be evident that a user in the virtual environment can view avatars of other users within the virtual environment, from a perspective of the user's own avatar.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Embodiments of the Present Disclosure

In a first aspect, an embodiment of the present disclosure provides a method for voice chat in a virtual environment, the method comprising:

receiving a plurality of audio streams corresponding to a plurality of avatars in the virtual environment;
determining relative distances between the avatars in the virtual environment;
calculating change in volumes of the audio streams, depending on the determined relative distances between the avatars;
normalising volumes of the audio streams depending on the calculated change in volumes;
mixing the normalised audio streams to create a plurality of mixed audio streams, wherein one mixed audio stream corresponds to one avatar; and
relaying the mixed audio streams to corresponding avatars.

In a second aspect, an embodiment of the present disclosure provides a system for voice chat in a virtual environment, the system comprising:

a plurality of user devices associated with a plurality of users, wherein one user device is associated with one user being represented by an avatar in the virtual environment;
a server communicably coupled to the plurality of user devices, wherein the server comprises a voice chat engine operable to:
receive a plurality of audio streams corresponding to a plurality of avatars in the virtual environment;
determine relative distances between the avatars in the virtual environment;
calculate change in volumes of the audio streams, depending on the determined relative distances between the avatars;
normalise volumes of the audio streams depending on calculated change in volumes;
mix the normalised audio streams to create a plurality of mixed audio streams, wherein one mixed audio stream corresponds to one avatar; and
relay the mixed audio streams to corresponding avatars.

The system for voice chat in a virtual environment comprises a plurality of user devices associated with a plurality of users, and a server communicably coupled to the plurality of user devices. Further, one user device is associated with one user.

According to an embodiment, the plurality of users refers to persons associated with the plurality of user devices. Specifically, the plurality of users uses the plurality of user devices for interacting in the virtual environment.

In an embodiment, the plurality of user devices is devices capable of supporting (or implementing) virtual reality. Specifically, one user may operate one user device to experience virtual reality by controlling one avatar representing the user in the virtual environment. Therefore, a plurality of avatars is associated with the plurality of users (associated with the plurality of user devices) in the virtual environment. Examples of user devices include, but are not limited to, smartphones, laptops, tablet computers, and head mounted displays.

It may be evident that each of the plurality of user devices may be coupled to (or may comprise) suitable equipment to allow interaction of the plurality of users with the virtual environment. Optionally, such suitable equipment may be external to the user devices. Examples of such suitable equipment include, but are not limited to, a microphone, touch screen, optical markers and speakers. Further, it may also be evident to a person skilled in the art that each of the plurality of user devices also includes communication means to facilitate communication with the server via a communication network.

In an embodiment, the communication network may be an individual network, or a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (Wi-MAX) networks.

According to an embodiment, the server generally refers to an application, program, process or device that responds to requests for information or services by another application, program, process or device (such as the plurality of user devices) via the communication network. According to another embodiment, the server also encompasses software that makes the act of serving information or providing services possible. It may be evident that the communication means of the plurality of user devices may be compatible with a communication means of the server, in order to facilitate communication therebetween.

The server comprises a voice chat engine. Specifically, the voice chat engine may be hardware, software, firmware, or combination of these, suitable for facilitating interaction between the plurality of users in the virtual environment by implementing voice chat. Specifically, the server may act as a hub for connecting the plurality of users (or avatars thereof) within the virtual environment. It may be evident that the server may support (or provide access to) more than one virtual environment. In such instance, the users of one virtual environment may interact only with other users present therein. For example, ten users may connect to the server and select a virtual environment (such as a cafeteria) from two virtual environments (such as a meadow and the cafeteria) supported by the server. Optionally, the users of one virtual environment may interact with users of other virtual environments.

In an embodiment, the server further comprises a database configured to store physical and spatial information of the avatars. Specifically, the database may be hardware, software, firmware, or combination of these, suitable for storing information related to the avatars. Additionally, the database may also include information related to one or more virtual environments supported by the server.

In an embodiment, the physical information of the avatars comprises physical attributes of the avatars. For example, physical attributes of an avatar may comprise appearance related attributes of the avatar such as height, weight, hair style, complexion, clothing, and so forth. According to an embodiment, the avatars may be selected and/or customised by the plurality of users. Specifically, the users may select physical attributes of avatars thereof. Alternatively, the avatars may be automatically generated by the server.

In an embodiment, the spatial information of the avatars comprises position coordinates of the avatars in the virtual environment. For example, the spatial information may comprise the X-axis, Y-axis and Z-axis coordinates of positions of avatars with respect to a reference point of origin in a three dimensional virtual environment.

In an embodiment, the avatars may be automatically generated at various position coordinates by the server. In alternative embodiments, the various position coordinates of the avatars may be selected by the users.

In operation, the voice chat engine of the server is operable to receive a plurality of audio streams corresponding to the plurality of avatars in the virtual environment. Specifically, the audio streams may be voices of the plurality of users associated with the avatars. For example, if four avatars are present in the virtual environment for interaction, the server receives four audio streams corresponding to voices of the four users. In an embodiment, the audio streams may have equal volume. In an alternative embodiment, the audio streams may have different volumes.

In an embodiment, the audio streams may be recorded (or received) using microphones coupled to the plurality of user devices. Further, the audio streams from each user may be sent to the server in real time. In another embodiment, the audio streams may be pre-recorded by the plurality of users.

Thereafter, the voice chat engine of the server is operable to determine relative distances between the avatars in the virtual environment. In an embodiment, the relative distances between the avatars are distances between position coordinates of the avatars in the virtual environment. In such embodiment, one avatar may be selected as a point of reference to determine distances between position coordinates thereof, and position coordinates of other avatars in the environment. Otherwise, the virtual environment may include a predetermined point of reference.

In an example, an avatar X may be selected as a point of reference among four avatars present in a virtual environment. Therefore the relative distances between the avatar X and other three avatars may be determined by determining distances between position coordinates of the avatar X and position coordinates of each of the other three avatars. For example, the other three avatars are avatars A, B, and C positioned at relative distances 50 meters, 70 meters and 140 meters respectively, from the avatar X in the virtual environment. It may be evident that relative distances between the avatars are similarly determined for each of the other three avatars in the virtual environment, by selecting another avatar as the point of reference. Also, the relative distances between the avatars may be determined with respect to the predetermined point of reference.

In an embodiment, a computing unit of the voice chat engine may be configured to determine the relative distances between the avatars. The determined relative distances between the avatars in the virtual environment may be stored on the database of the server.

Further, the voice chat engine of the server is operable to calculate change in volumes of the audio streams, depending on the determined relative distances between the avatars (i.e. spatial distance relation, particularly, volume with respect to distance). Specifically, change in volumes of the audio streams may be required in order to simulate proximity based voice chat in the virtual environment. It may be evident that proximity based voice chat enables the virtual environment to appear more real by simulating change in volumes of avatars according to distance therebetween. In an embodiment, the computing unit of the voice chat engine may be operable to calculate change in volumes of the audio streams.

In an embodiment, change in volumes of the audio streams of avatars comprises reduction in volume. Specifically, the reduction in volumes of avatars may be desired with increase in the relative distances between the avatars. More specifically, reduction in volume may be desired to simulate proximity based voice chat between distantly positioned avatars.

In another embodiment, change in volumes of the audio streams of avatars comprises increase in volume. Specifically, the increase in volumes of avatars may be desired with decrease in the relative distances between the avatars. More specifically, increase in volume may be desired to simulate proximity based voice chat between closely positioned avatars.

Referring again to the aforementioned example, change in volume of avatar A may be an increase of 3 decibel since the avatar A is positioned closest to the avatar X. Similarly change in volume of avatar B may be a reduction of 1 decibel since the avatar B is positioned further from the avatar X, as compared to the avatar A. Similarly, change in volume of avatar C may be a reduction of 8 decibel since the avatar C is positioned farthest from the avatar X in the virtual environment. It may be evident that change in volumes of the audio streams may be similarly calculated for each of the other three avatars selected as the point of reference in the virtual environment.

In an embodiment, calculating change in relative volume of the audio streams of avatars comprises use of a mathematical function. In one embodiment, the mathematical function is at least one of a linear function, an exponential function and a logarithmic function.

The voice chat engine of the server is further operable to normalise volumes of the audio streams depending on the calculated change in volumes. Specifically volumes of the audio streams are normalised (or brought to a certain value) as per the calculated changes in volumes to generate normalised audio streams of avatars that simulate proximity based voice chat in the virtual environment.

In an embodiment, for calculated change in volumes of the audio streams comprising reduction in volume, then volumes of the audio streams are normalised by attenuating the audio streams to implement the calculated change. In another embodiment, for calculated change in volumes of the audio streams comprising increase in volume, then volumes of the audio streams are normalised by amplifying the audio streams to implement the calculated change. Therefore, it may be evident to a person skilled in the art that calculating change in relative volume of the audio streams of avatars relates simply to computation of required change in volumes of the audio streams, whereas normalising volumes of the audio streams relates to implementation of the required change in volumes. It may also be evident that volumes of audio streams are similarly normalised for each of the other three avatars selected as the point of reference in the virtual environment.

Thereafter, the voice chat engine of the server is operable to mix the normalised audio streams to create a plurality of mixed audio streams, wherein one mixed audio stream corresponds to one avatar. Specifically, each of the mixed audio streams is a combination of multiple normalised audio streams. It may be evident to a person skilled in the art, that the one mixed audio stream corresponding to the one avatar includes normalised audio streams of all avatars in the virtual environment, except the one avatar. In an embodiment, the voice chat engine may comprise an audio mixer for mixing the normalised audio streams to create the plurality of mixed audio streams.

Referring yet again to the aforementioned example, one mixed audio stream corresponding to the avatar X is created by mixing the three normalised audio streams (of the avatars A, B, and C). It may be evident that mixed audio streams are similarly created for each of the other three avatars selected as the point of reference in the virtual environment.

The voice chat engine of the server is further operable to relay the mixed audio streams to corresponding avatars. In an embodiment, the communication means of the server may relay the mixed audio streams to the plurality of user devices associated with corresponding users (or avatars thereof). With reference to the aforementioned example, the mixed audio stream corresponding to the avatar X, created by mixing the three normalised audio streams (of the avatars A, B, and C), is relayed to the avatar X.

In an embodiment, the server (or the voice chat engine thereof) is further, operable to analyse the received plurality of audio streams to derive lip-sync information corresponding to the plurality of avatars. Specifically, the server may comprise an audio analyser module to analyse the received plurality of audio streams. In an embodiment, the lip-sync information comprises phonemes. It may be evident to a person skilled in the art that phonemes are smallest units of sound, which may be used to differentiate between two words in a language. Further, a person skilled in the art that would also know that phonemes are language-specific, i.e. there exist different phonemes for different languages.

Optionally, lip-sync information may also include visual representations of lip movements of the plurality of avatars corresponding to phonemes in the received plurality of audio streams. For example, lip-sync information may comprise visemes, i.e. visual representations of lip movements corresponding to phonemes. Optionally, the derived lip-sync information may be stored on the database of the server.

According to an embodiment, analysing the received audio streams to derive lip-sync information comprises implementing Fourier analysis algorithms to determine phonemes corresponding to the received audio streams. In an embodiment, the Fourier analysis algorithms are Fast Fourier analysis algorithms. In another embodiment, the Fourier analysis algorithms are Discrete Fourier analysis algorithms. The computing unit of the voice chat engine may be configured to implement the Fourier analysis algorithms. Thereafter, the server may further be operable to add the derived lip-sync information to the mixed audio streams. The audio mixer of the voice chat engine may add the derived lip-sync information to the mixed audio streams. Further, the server may be operable to change lip movements of the plurality of avatars depending on the added lip-sync information. Specifically, change in lip movements are in sync with phonemes determined corresponding to the audio streams of the plurality of avatars. In an embodiment, the server may be operable to change the lip movements of the avatars in real time.

According to an embodiment, the server is operable to add environmental cues to the mixed audio streams. The environmental cues may be added to the mixed audio streams by the audio mixer of the voice chat engine. The environment cues may be sensory indicators used to enhance perception of reality for the avatars in the virtual environment. In an embodiment, the environmental cues may include auditory cues. For example, auditory environmental cues in a stormy virtual environment may include the sound of rain and the sound of thunder. Alternatively, the environmental cues may include, but are not limited to, visual cues, and so forth.

In an embodiment, adding environmental cues to the mixed audio streams may further comprise recreating an audio signature associated with a location in the virtual environment. The audio signature of a location may enhance perception of reality for avatars at that location. In an embodiment, the audio signature of a location may include at least one of an audio signal, ambient noise, and reverberations. For example, a specific room of a haunted house in the virtual environment may be associated with an audio signature such as a sound of bats. In such instance, the audio signature (namely, the sound of bats) may be recreated as an avatar enters that specific room of the haunted house. The audio signatures associated with locations in the virtual environment may be pre-created and stored on the database of the server.

In an embodiment, the virtual environment comprises a plurality of locations therein. According to an embodiment, the virtual environment comprises a first location and a second location spaced apart from the first location by a predetermined distance, and each of the first and second locations includes at least one avatar. Moreover, the first and second locations may be accessible to each other via at least one route (or link) in the virtual environment. In an embodiment, the predetermined distance between the first and second locations may be length of a shortest route therebetween. In an example, a virtual environment of a house may include a plurality of locations, such as a bedroom, a kitchen, a restroom, a lobby, and a balcony.

In an embodiment, the balcony may be the first location comprising three avatars and the kitchen may be the second location comprising two avatars. In such embodiment, the server may be configured to mix audio streams of the at least one avatar present in the first location to create a first audio stream. Specifically, audio streams of the at least one avatar present in the first location may be mixed at an equal volume level, at different volume levels or at normalised volumes thereof (as described previously). Referring to the aforementioned example, audio streams of the three avatars in the balcony may be mixed to create a first audio stream. Similarly, the server may further be configured to mix audio streams of the at least one avatar present in the second location to create a second audio stream. Based on the aforementioned example, audio streams of the two avatars in the kitchen may be mixed to create a second audio stream.

Thereafter, the server may be configured to normalise volumes of the first and second audio streams depending on the predetermined distance between the first and second locations. Specifically, volumes of the audio streams may be normalised to simulate proximity based voice chat in the virtual environment. Further the server may mix the normalised audio streams to create a first and a second mixed audio stream, such that one mixed audio stream corresponds to one location. Based on the aforementioned example, normalised first and second audio streams are mixed to create a first and second mixed audio streams corresponding to the balcony and kitchen, respectively. Thereafter, the server may relay the first and second mixed audio streams to the at least one avatar at corresponding locations.

The present disclosure provides a method and a system for voice chat in a virtual environment. The method described in the present disclosure overcomes the drawbacks associated with conventional techniques for voice chat in a virtual environment by implementing proximity based voice chat for enhancing perception of reality for avatars within the virtual environment. The system and method of the present disclosure simulate change in volumes of voices of users (or avatars) with respect to spatial distance between the avatars. Therefore, a user in the virtual environment is able to correctly comprehend spatial distance relations (volume with respect to distance) between the user's own avatar, and any other avatar in the virtual environment, based on volume of voice of the other avatar. Moreover, due to proximity based voice chat, the described system and method allow the users to comprehend speech of other users easily.

DETAILED DESCRIPTION OF THE DRAWINGS

Referring to FIG. 1, illustrated is a schematic illustration of a system 100 for voice chat in a virtual environment, in accordance with an embodiment of the present disclosure. The system 100 includes a plurality of user devices, such as user devices 102A, 102B, and 102C, associated with a plurality of users 104A, 104B, and 104C, respectively. The system 100 further includes a server 106 communicably coupled to the user devices 102A, 102B, and 102C via a communication network 108. The server 106 comprises a voice chat engine 110 operable to implement voice chat between avatars representing the users 104A, 104B, and 104C in the virtual environment. The server may further comprise a database (not shown).

FIG. 1 is merely an example, which should not unduly limit the scope of the claims herein. A person skilled in the art will recognize many variations, alternatives, and modifications of embodiments of the present disclosure.

Figure 2:
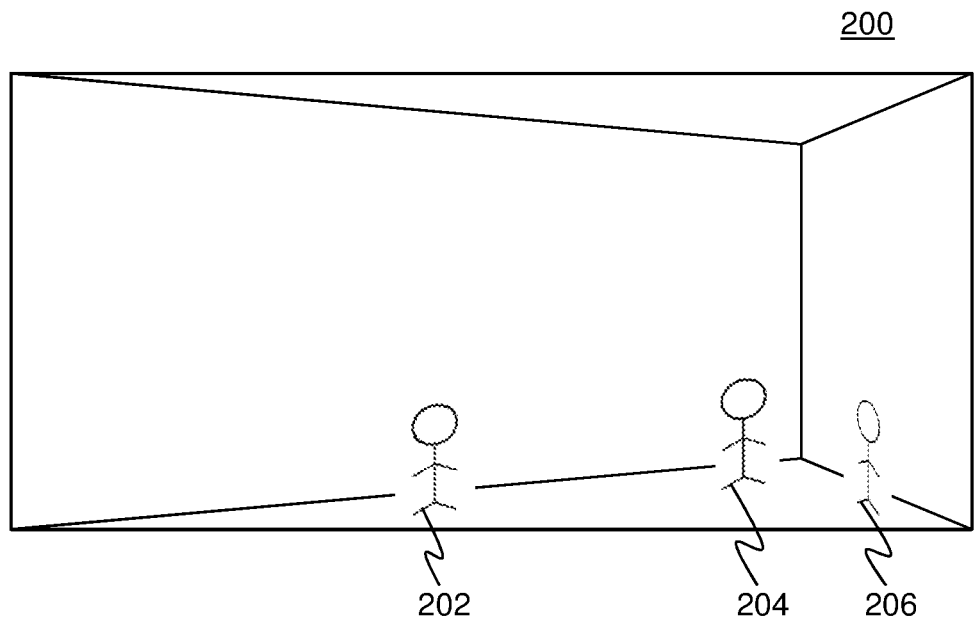
FIG. 2 is a schematic illustration of an exemplary virtual environment, in accordance with an embodiment of the present disclosure.

Referring to FIG. 2, illustrated is a schematic illustration of an exemplary virtual environment 200, in accordance with an embodiment of the present disclosure. As shown, the virtual environment 200 includes a plurality of avatars, such as 202, 204, and 206. The plurality of avatars 202, 204, and 206 represent a plurality of users (for example, users 104A, 104B, and 104C of FIG. 1) in the virtual environment 200. The avatars 202, 204, and 206 interact with each other by voice chat in the virtual environment 200. As shown, the avatars 202, 204, and 206 are at different positions within the virtual environment 200.

FIG. 2 is merely an example, which should not unduly limit the scope of the claims herein. A person skilled in the art will recognize many variations, alternatives, and modifications of embodiments of the present disclosure.

Figure 3:
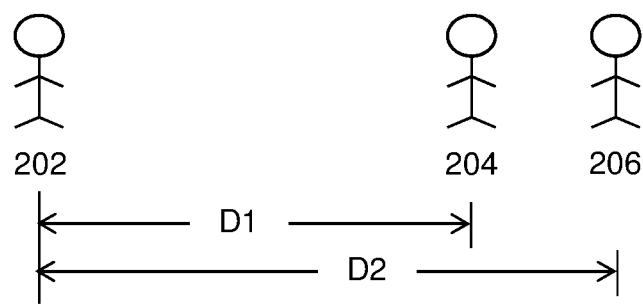
FIG. 3 is an illustration of relative distances between avatars in the exemplary virtual environment, in accordance with an embodiment of the present disclosure.

Referring to FIG. 3, illustrated a schematic illustration depicting relative distances between avatars in the exemplary virtual environment 200 (of FIG. 2), in accordance with an embodiment of the present disclosure. As shown in FIG. 2, the avatars 202, 204, and 206 are at different positions within the virtual environment 200. As shown in FIG. 3, D1 represents relative distance between position coordinates of avatars 202 and 204 in the virtual environment 200. Similarly, D2 represents relative distance between position coordinates of avatars 202 and 206 in the virtual environment 200. It may be evident from FIG. 2 and FIG. 3 that distance D2 (between avatars 202 and 206) is greater than the distance D1 (between avatars 202 and 204).

FIG. 3 is merely an example, which should not unduly limit the scope of the claims herein. A person skilled in the art will recognize many variations, alternatives, and modifications of embodiments of the present disclosure.

Figure 4:
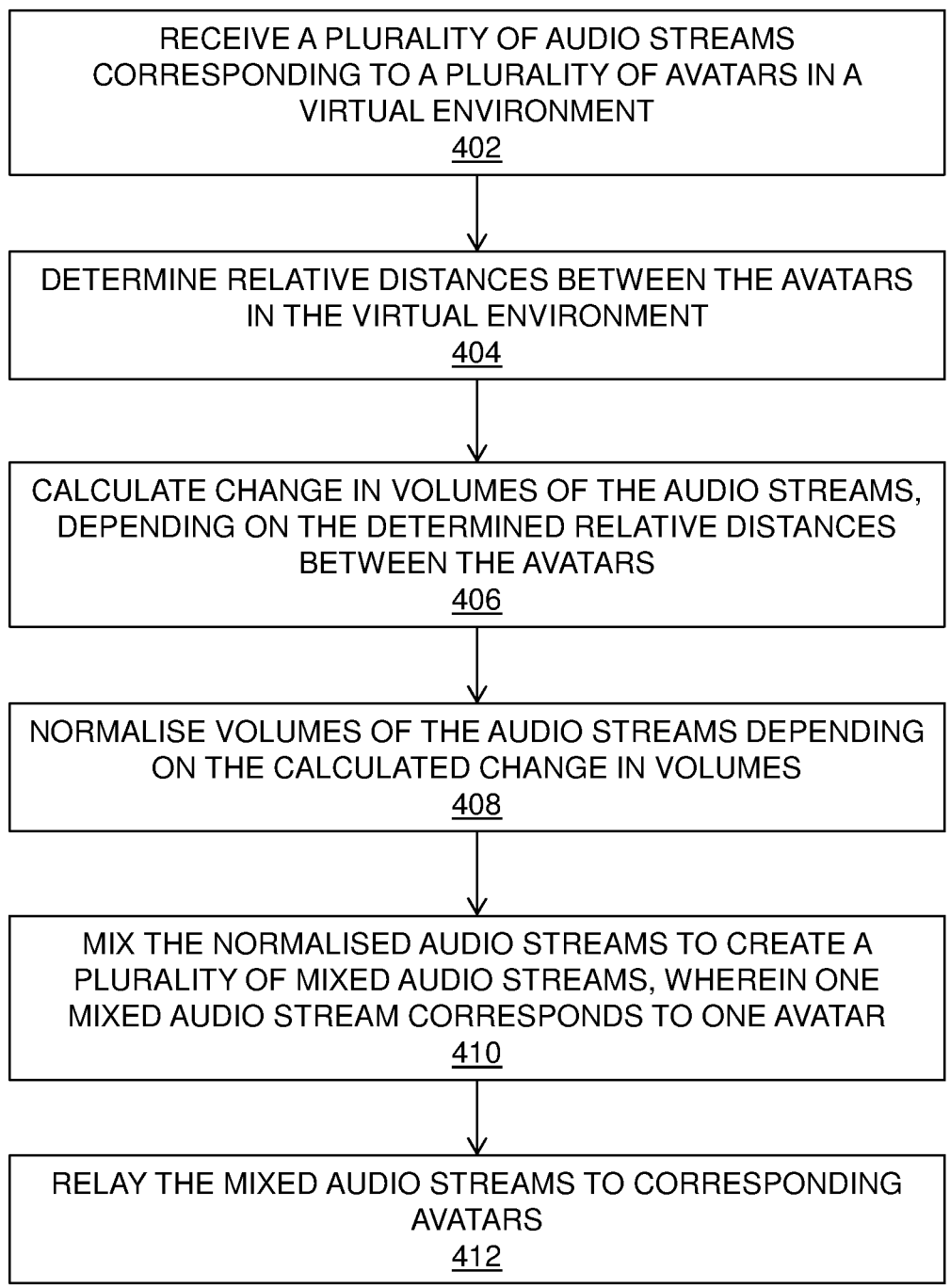
FIG. 4 is an illustration of steps of a method for voice chat in a virtual environment, in accordance with an embodiment of the present disclosure.

Referring to FIG. 4, illustrated are steps of a method 400 for voice chat in a virtual environment, in accordance with an embodiment of the present disclosure.

At step 402, a plurality of audio streams corresponding to a plurality of avatars in a virtual environment is received. At step 404, relative distances between the avatars in the virtual environment are determined. At step 406, change in volumes of the audio streams is calculated, depending on the determined relative distances between the avatars. At step 408, volumes of the audio streams are normalised depending on the calculated change in volumes. At step 410, the normalised audio streams are mixed to create a plurality of mixed audio streams, wherein one mixed audio stream corresponds to one avatar. At step 412, the mixed audio streams, are relayed to corresponding avatars.

The steps 402 to 412 are only illustrative and other alternatives can also be provided where one or more steps are added, one or more steps are removed, or one or more steps are provided in a different sequence without departing from the scope of the claims herein. For example, in the method 400, the relative distances between the avatars may be distances between position coordinates of the avatars in the virtual environment. Further, in the method 400, calculating change in volumes of the audio streams of avatars may comprise use of a mathematical function. In such instance, the mathematical function may be at least one of a linear function, an exponential function and a logarithmic function. Moreover, in the method 400, change in volumes of the audio streams of avatars may comprise reduction in volume. Alternatively, in the method 400, change in volumes of the audio streams of avatars may comprise increase in volume.

The method 400 may further comprises analysing the received plurality of audio streams to derive lip-sync information corresponding to the plurality of avatars, adding the derived lip-sync information to the mixed audio streams, and changing lip movements of the plurality of avatars depending on the added lip-sync information. In such instance, the lip-sync information may comprise phonemes. Moreover, in the method 400, analysing the received audio streams to derive lip-sync information may comprise implementing Fourier analysis algorithms to determine phonemes corresponding to the received audio streams. Specifically, in the method 400, the Fourier analysis algorithms may be fast Fourier analysis algorithms. Further, in the method 400, relaying the derived lip-sync information may comprise adding the derived lip-sync information to the mixed audio streams. In an example, the method 400 may further comprise adding environmental cues to the mixed audio streams. The environmental cues may comprise auditory cues.

Optionally, in the method 400, the virtual environment may comprise a first location and a second location spaced apart from the first location by a predetermined distance, and each of the first and second locations includes at least one avatar. In such instance, the method 400 may comprise mixing audio streams of the at least one avatar present in the first location to create a first audio stream, mixing audio streams of the at least one avatar present in the second location to create a second audio stream, normalising volumes of the first and second audio streams depending on the predetermined distance between the first and second locations, mixing the normalised audio streams to create a first and a second mixed audio stream, such that one mixed audio stream corresponds to one location, and relaying the first and second mixed audio streams to the at least one avatar at corresponding locations.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for voice chat in a virtual environment, the method comprising:
   receiving a plurality of audio streams corresponding to a plurality of avatars in the virtual environment, wherein the virtual environment comprises a first location and a second location spaced apart from the first location by a predetermined distance, and each of the first and second locations includes at least one avatar;
   calculating change in volumes of the audio streams, depending on the predetermined distance between the first and second locations;
   mixing audio streams of the at least one avatar present in the first location to create a first audio stream;
   mixing audio streams of the at least one avatar present in the second location to create a second audio stream;
   normalising volumes of the first and second audio streams depending on the predetermined distance between the first and second locations;
   mixing the normalised audio streams to create a first and a second mixed audio streams; and
   relaying the first and second mixed audio streams to the at least one avatar at corresponding locations.

2. A method according to claim 1, wherein the predetermined distance between the first and second location is a length of a shortest route between the first and second location in the virtual environment.

3. A method according to claim 1, wherein calculating change in volumes of the audio streams comprises use of a mathematical function.

4. A method according to claim 3, wherein the mathematical function is at least one of a linear function, an exponential function and a logarithmic function.

5. A method according to claim 1, wherein change in volumes of the audio streams comprises reduction in volume and increase in volume.

6. A method according to claim 1, wherein the method further comprises adding environmental cues to the mixed audio streams.

7. A method according to claim 6, wherein the environmental cues comprises auditory cues.

8. The method of claim 1 further comprising:
   receiving an audio stream corresponding to each of the avatars in the virtual environment; and
   relaying an audio stream to a user device, the audio stream comprising audio streams of avatars other than an avatar associated with the user device.

9. A method for voice chat in a virtual environment, the method comprising:
   receiving a plurality of audio streams corresponding to a plurality of avatars in the virtual environment;
   determining relative distances between the avatars in the virtual environment;
   calculating change in volumes of the audio streams, depending on the determined relative distances between the avatars;
   normalising volumes of the audio streams depending on the calculated change in volumes;
   mixing the normalised audio streams to create a plurality of mixed audio streams, wherein one mixed audio stream corresponds to one avatar; and
   relaying the mixed audio streams to the corresponding avatars;
   the method further comprising:
   analysing the received plurality of audio streams to derive lip-sync information corresponding to the plurality of avatars;
   adding the derived lip-sync information to the mixed audio streams; and
   changing lip movements of the plurality of avatars depending on the added lip-sync information.

10. A method according to claim 9, wherein the lip-sync information comprises phonemes.

11. A method according to claim 9, wherein analysing the received audio streams to derive lip-sync information comprises implementing Fourier analysis algorithms to determine phonemes corresponding to the received audio streams.

12. A method according to claim 11, wherein the Fourier analysis algorithms are Fast Fourier analysis algorithms.

13. The method of claim 9, further comprising:
receiving an audio stream corresponding to each of the avatars in the virtual environment; and
relaying an audio stream to a user device, the audio stream comprising audio streams of avatars other than an avatar associated with the user device.

14. A system for voice chat in a virtual environment, the system comprising:
a plurality of user devices associated with a plurality of users, wherein one user device is associated with one user being represented by an avatar in a first location in the virtual environment, and another user being represented by an avatar in a second location in the virtual environment;
a server communicably coupled to the plurality of user devices, wherein the server comprises a voice chat engine operable to:
receive a plurality of audio streams corresponding to the avatars in the virtual environment;
determine relative distances between the first and second locations in the virtual environment;
calculate change in volumes of the audio streams, depending on the determined relative distances between the first and second locations;
mix audio streams of the at least one avatar present in the first location to create a first audio stream;
mix audio streams of the at least one avatar present in the second location to create a second audio stream;
normalise volumes of the first and second audio streams depending on the predetermined distance between the first and second locations;
mix the normalised audio streams to create a first and a second mixed audio streams; and
relay the first and second mixed audio streams to the avatar at each corresponding location.

15. A system according to claim 14, wherein the server further comprises a database configured to store physical and spatial information of the avatars.

16. A system according to claim 15, wherein the physical information of the avatars comprises physical attributes of the avatars.

17. A system according to claim 15, wherein the spatial information of the avatars comprises position coordinates of the avatars in the virtual environment.

18. The system according to claim 14, wherein the voice chat engine of the server is operable to:
receive an audio stream corresponding to each of the avatars in the virtual environment;
relaying an audio stream to a user device, the audio stream comprising audio streams of avatars other than an avatar associated with the user device.

* * * * *